Patented June 21, 1949

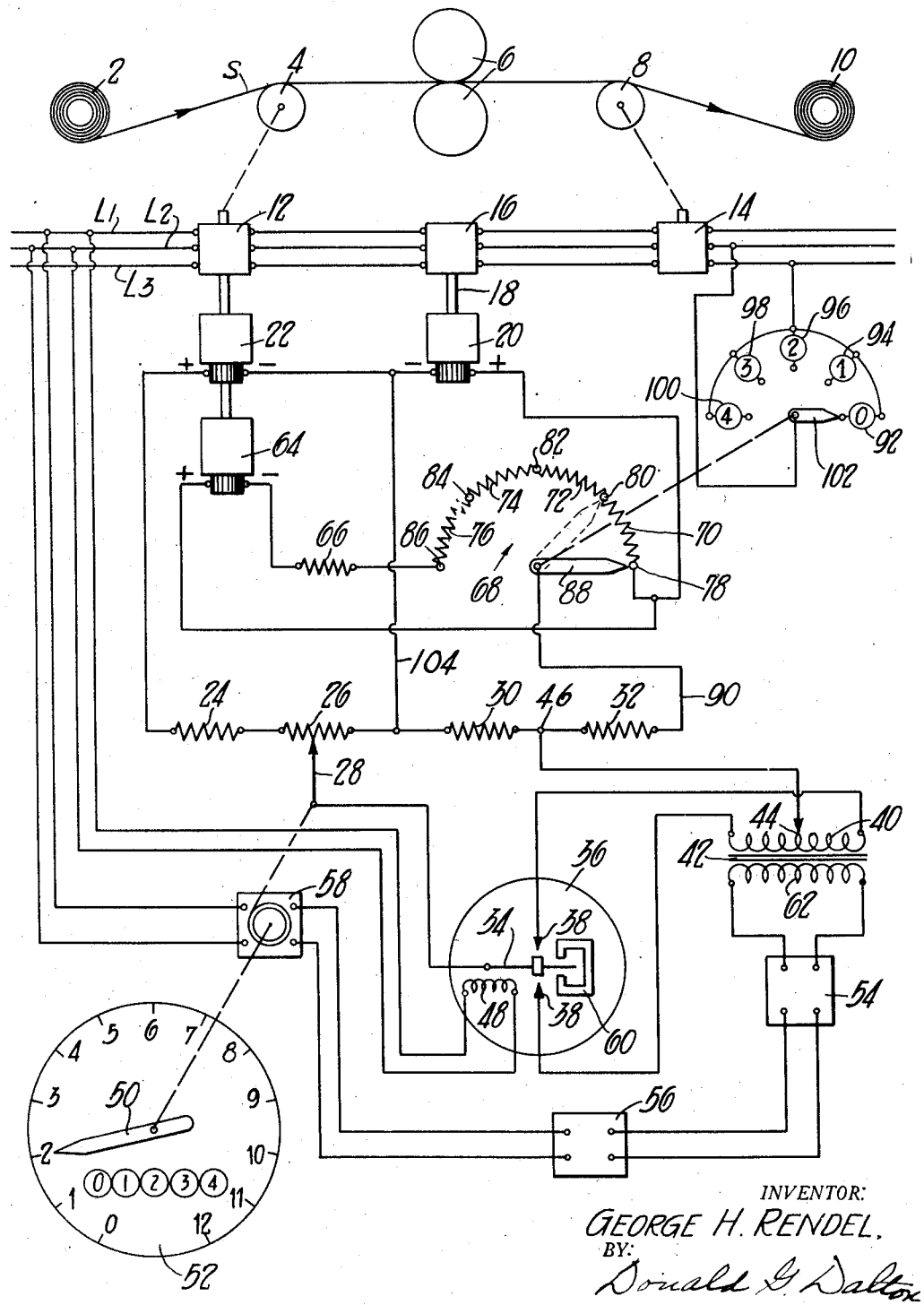

2,474,116

UNITED STATES PATENT OFFICE 2,474,116

APPARATUS FOR MEASURING DIFFERENTIAL SPEED

George H. Rendel, Pittsburgh, Pa., assignor to Carnegie-Illinois Steel Corporation, a corporation of New Jersey Application May 12, 1948, Serial No. 26,646

2 Claims. (Cl. 235—61)

This invention relates to apparatus for measuring differential speed and is a continuation-in-part of my copending applications, Serial No. 509,240, filed may 17, 1945, now Patent No. 2,447,208, and Serial No. 679,955, filed June 28, 1946, now Patent No. 2,447,209.

In measuring differential speeds for various purposes, such as for determining strip extension or strip gauge as disclosed in my aforesaid patent applications, it is desirable to use a scale having units which are as large as possible. When the variation in the characteristic being determined is great, it is impossible to have a scale which will cover all ranges of characteristics being determined and at the same time have large unit markings.

It is, therefore, an object of my invention to provide apparatus which will permit a single scale to be used for indicating readings of different scope without changing the value of each individual unit on the scale.

This and other objects will be more apparent after referring to the following specification and attached drawing, in which the single figure is a schematic view showing one embodiment of my invention.

Referring more particularly to the drawing, the strip S is shown passing from an uncoiler 2 over the entry deflector roll 4, through the rolling mill 6, over the delivery deflector roll 8 and being rewound on the coiler 10. By way of example, the operation may be considered as temper rolling in which the reduction is very small and the strip is under tension. Since the strip is in contact with the deflector rolls, they will rotate with a peripheral speed corresponding to the strip speed at their respective locations. A motion transmitting device 12 is suitably driven from the entry deflector roll 4 and a second motion transmitting device 14 is driven from the delivery deflector roll 8. The motion transmitting devices 12 and 14 may be of any suitable type, but are shown here as the well-known alternating current "Synchro-tie," each device being provided with a three circuit armature winding and a three circuit field winding supplied from a source of alternating current L—1, L—2 and L—3. The transmitters 12 and 14 are electrically connected to a "Synchro-tie" receiver 16 which has a three circuit armature winding and a three circuit field winding, the armature of one of the transmitters being connected to the field of the receiver and the armature of the other transmitter to the armature of the receiver. The "Synchro-tie" transmitters and receivers are so constructed that rotation of either transmitter produces a synchronous rotating magnetic field in the winding of the receiver to which it is connected and the rotating field causes the armature of the receiver to rotate an equal amount so that the speed of rotation of the armature of the receiver is the algebraic sum of the speed of the transmitters. The forward motion of the strip in revolving the exit transmitter 14 produces a forward rotation of the field in receiver 16 while the same forward motion of the strip in revolving entry transmitter 12 causes the field of receiver 16 to rotate in the reverse direction so that receiver 16 rotates at a speed which is directly proportional to the difference of the entry and exit speeds of the strip. The shaft 18 is rotated by the receiver 16 and is connected to a generator 20. The combination of the devices 12, 14 and 16 is the electrical equivalent of a differential gear system and the latter could be used in its stead. If both rolls 4 and 8 revolve at the same speed, the differential is zero so that the shaft 18 will not rotate. If the rolls are revolved at unlike speeds, the shaft 18 will rotate at a speed equal to the difference of the roll speeds. In either case, the tachometer generator 20 is driven at a speed proportional to the difference in speed of the rolls 4 and 8 and its voltage output is directly proportional to the differential strip speed and can, therefore, serve as a basis for indicating and/or controlling the extension being effected by the mill. Since only one generator is used, which generator is driven by a differential receiver, the maximum possible error in the measurement of this difference is 1% (the inherent error of one speed measuring system). In the special case where the speed of rolling is constant, the performance of the mill can be visually indicated merely by connecting a volt meter across the terminals of generator 20 and calibrating it to read "percent extension."

In case the mill speed varies, the voltage output of generator 20 will vary directly with the mill speed even though the extension effected by the mill remains constant. Thus, if the voltage output from tachometer generator 20 is 100 millivolts when an extension of 1% is obtained at a strip speed of 100 feet per minute, the tachometer generator 20 will generate 2000 millivolts or 2 volts when the strip speed is raised to 2000 feet per minute with the same extension. From the foregoing it is seen that the output of generator 20 will not indicate the true percent of extension at all speeds. In order to compensate for changes in the speed of the strip, a tachometer generator 22 is connected to be driven from transmitter 12. Since the voltage output of generator 20 varies directly with the differential strip speed and the mill speed, and the voltage output of generator 22 varies directly with the mill speed, the ratio between the two voltages will indicate the percent extension. The ratio of the two voltages can be measured by a modified indicating recording potentiometer such as a "Brown Electronik." The voltage output from generator 22 is connected to a suitable voltage divider network which is comprised of resistor 24 and variable resistor or slide wire 26 which is provided with contact arm 28 for varying the amount of the resistance in series with the generator 22. The voltage output of generator 20 is connected to another voltage dividing network which is comprised of resistors 30 and 32. The contact arm 28 is electrically connected to the vibrating contact 34 of a convertor 36 having stationary contacts 38 which are connected to the primary windings 40 of a center tapped transformer 42. The center tap 44 of the primary winding 40 is connected to a point 46 between resistances 30 and 32. Power for driving the vibrating contact 34 of convertor 36 is obtained from an energizing coil 48 which is connected to the lines L—1 and L—2. Generators 20 and 22 have common negative terminals. The voltage drop across variable resistor 26 varies directly with the output of generator 22. The voltage drop across resistor 30 varies directly with the output of generator 20. That portion of the voltage drop across resistor 26 applied to convertor 36 can be made equal to the voltage drop across resistor 30 by adjusting the position of the sliding contact arm 28. When this is done, the position of contact arm 28 represents the ratio between the combined voltages of generators 20 and 22 and the voltage of slide wire 26. Contact arm 28 is connected to an indicating pointer 50 mounted on a dial 52 which is graduated from 0 to 12 as shown. The position of arm 28 is adjusted by the convertor 36, the voltage amplifier 54 and power amplifier 56 and a balancing motor 58, which motor is mechanically connected to the contact arm 28 and also to the indicating pointer 50 so that the arms 28 and 50 move proportionally to one another. Convertor 36 is a single pole double throw switch operated in synchronism with the power supply line voltage by means of the energizing coil 48 which is continuously energized from power supply lines L—1 and L—2, the switch being polarized by means of a permanent magnet 60 so that one of its stationary contacts 38 will always be in contact with the vibrating contact 34 during the positive half cycle of the voltage supply and the other stationary contact 38 will be in contact with the vibrating contact 34 during the negative half cycle. Transformer 42 serves as a coupling device between the measuring circuit, contact arm 28, point 46, and the electronic voltage amplifier 54. Input transformer 42 has a dual input which, in conjunction with the convertor 36, supplies an alternating current voltage from the secondary winding 62, the magnitude of which is proportional to the direct current unbalance of the measuring circuit and whose phase relation is dependent upon the direction of unbalance. When potential exists between contact arm 28 and point 46, it is impressed on the primary windings 40 and appears on the secondary winding 62 as an alternating current whose magnitude is proportional to the direct current unbalance. The alternating current from secondary winding 62 is transferred to the voltage amplifier 54 which amplifies it from a low value of several microvolts to a value of several volts. The voltage output from the voltage amplifier 54 is transmitted to the power amplifier 56 which amplifiers the power that controls the balancing motor 58 which is mechanically connected to the contact arms 28 and 50. Both the phase relation and the magnitude of the driving power of motor 58 are directly controlled by the voltage amplifier 54. The balancing motor 58 is a reversible induction motor having two windings. One winding is continuously energized from the supply lines L—1 and L—2 and the other winding is energized by power amplifier 56 with current whose phase relation with respect to that of the line current determines the direction of rotation of the balancing motor 58 and whose magnitude determines the rotational speed of the balancing motor. When the contact arm 28 is moved to a point where the opposing potentials are balanced, there is no potential to convert or amplify and the balancing motor 58 stops. The pointer 50 then indicates the percent extension being effected by the mill. The apparatus so far described, is disclosed in my above mentioned copending applications. With this apparatus it is only possible to indicate a percentage reduction up to 12%.

According to the present invention a generator 64 is provided which is also driven by roll 4. Voltage output of this generator is proportional to strip speed. The generator 64 is provided with a voltage dividing network which includes the resistance 66 and a potentiometer or variable resistance 68 which can be called a range switch. Potentiometer 68 is comprised of resistors 70, 72, 74 and 76, contact buttons 78, 80, 82, 84 and 86, and contact arm 88. The negative terminal of generator 64 is connected to contact point 86 and the positive terminal of generator 20 is connected to the contact button 78 with the contact arm 88 being connected through line 90 to resistance 32. Thus it is seen that the network of generator 64 is connected into that of generator 20 in such a manner that a selectable portion of the output of generator 64 can be placed in electrical opposition to that of generator 20, the proportion depending upon the positioning of contact arm 88. If desired, indicating lights 92, 94, 96, 98 and 100 can be provided to indicate the position of range switch 68. These are controlled by the contact arm 102 which is mechanically connected for rotation with the contact arm 88. Power is supplied to the lights by a suitable source, such as lines L—2 and L—3. Suitable recording apparatus might be used instead of or in addition to the indicating lights. Generator 64 through its circuit can suppress the point on slide wire 26 at which the contact arm 28 indicates electrical balance between generators 20 and 22.

When the range switch is in the zero position, as shown in full lines in the drawing, there is no voltage subtracted from the output of generator 20 and the indicated reading is a true reading of percentage reduction. When the range switch is set in position 1 to contact button 80 an opposing potential is applied to the voltage dividing network of generator 20, which is always equal to the potential output from generator 20 when a reduction of 10% is effected on the mill 6. Thus 10% must be added to the indicated value to obtain the true reading. When arm 88 contacts buttons 82, 84 and 86, respectively, an opposing potential is applied to the voltage dividing network of generator 20, which is equal to the electrical output from generator 20 when reductions of 20, 30 or 40%, respectively, are being effected. Therefore, 20, 30 or 40% must be added to the indicated value to obtain the true reading.

Each of the five positions shown on range switch 68 provides a predetermined degree of suppression of the true reading and also an indication of the quantity subtracted from the true reading. The use of the suppression means permits employing any desired number of positions or ranges to provide wide variations and differential measurements on one relatively small graduated scale and yet provide ample spacing between divisions on the scale, thus providing greater accuracy and stability.

If 11% reduction is being effected by roll stand 6 with an entry strip speed of 1000 feet per minute, it can be assumed that the voltage output from generators 22 and 64 is 10 volts and that the range switch is set on the off position shown in full lines in the drawing. Generator 20 will be rotating at a speed corresponding to the difference in speed between rolls 4 and 8 and, for illustration, will be assumed to produce 2.2 volts which is impressed on its voltage dividing network causing a potential drop of .09166 volt across resistor 30. The voltage drop across slide wire 26 will be assumed to be .09996 volt. Under these conditions the measuring circuit will cause contact arm 28 to be moved 1⅒ of its travel distance on the slide wire 26 where the circuit will be balanced at a position showing 11% on scale 52. Light 92 will be lit showing that the true reading is indicated on dial 52. Assuming the same conditions except that the arm 88 is contacting button 80, light 94 will be lit indicating that 10% must be added to the indicated reading on scale 52 in order to determine the true percentage reduction. In this position, contact arm 88 will connect wire 90 to button 80, thereby introducing the potential drop across resistor 70 into the circuit of generator 20. This potential is in opposition to the output from generator 20 so that the voltage impressed across lead wires 90 and 104 is equal to the voltage output of generator 20 minus the voltage drop across resistor 70. The 10 volt output from generator 22 produces a potential drop of .09996 volt across slide wire 26 and the 10 volt output from generator 64 produces a 2 volt drop across resistor 70 so that the effective potential impressed on wires 90 and 104 equals the 2.2 volts output from generator 20 minus the 2 volt drop across resistor 70 or .2 volt. This .2 volt impressed on wires 90 and 104 causes a potential drop of .00833 volt across resistor 30. The measuring circuit will cause the contact arm 28 to move 1/12 the travel distance on slide wire 26 where it will be balanced at a position corresponding to 1 on the calibrated scale 52. In like manner the operator can move the arm 88 to buttons 82, 84 or 86, depending upon the amount of reduction desired to be taken on roll stands 6.

While one embodiment of my invention has been shown and described it will be apparent that other adaptations and modifications may be made without departing from the scope of the following claims.

I claim:

1. Apparatus for comparing the speed relationship between two moving objects which comprises means connected to be driven at a speed proportional to the speed of one of the objects, means connected to be driven at a speed proportional to the speed of the other object, a differential receiver connected to both of said means for obtaining the difference in their speeds, a tachometer generator driven by said differential receiver, a second tachometer generator driven at a speed proportional to the speed of one of the objects, a third tachometer generator connected to be driven at the same speed as the second named generator, a variable resistance in series with the second named generator, a contact arm for varying the amount of said resistance in series with the second named generator, a variable resistance in series with the first and third generators, a contact arm for the last named resistance for varying the amount of said resistance in series with the first generator, and means responsive to the difference between the voltage drop across the first named resistance and the summation voltage from the first and third generators for moving said first named contact arm to balance said voltages, the position of said contact arm when the voltages are balanced indicating the speed relationship.

2. Apparatus for comparing the speed relationship between two moving objects which comprises means connected to be driven at a speed proportional to the speed of one of the objects, means connected to be driven at a speed proportional to the speed of the other object, a differential receiver connected to both of said means for obtaining the difference in their speeds, a tachometer generator driven by said differential receiver, a second tachometer generator driven at a speed proportional to the speed of one of the objects, a third tachometer generator connected to be driven at the same speed as the second named generator, a variable resistance in series with the second named generator, a contact arm for varying the amount of said resistance in series with the second named generator, a variable resistance in series with the first and third generators, the negative terminal of the third generator being connected to one side of said last named resistance and the positive terminal of the first generator being connected to the other side thereof, a contact arm for the last named resistance for varying the amount of said resistance in series with the first generator, and means responsive to the difference between the voltage drop across the first named resistance and the summation voltage from the first and third generators for moving said first named contact arm to balance said voltages, the position of said contact arm when the voltages are balanced indicating the speed relationship.

GEORGE H. RENDEL.

No references cited.